UNITED STATES PATENT OFFICE.

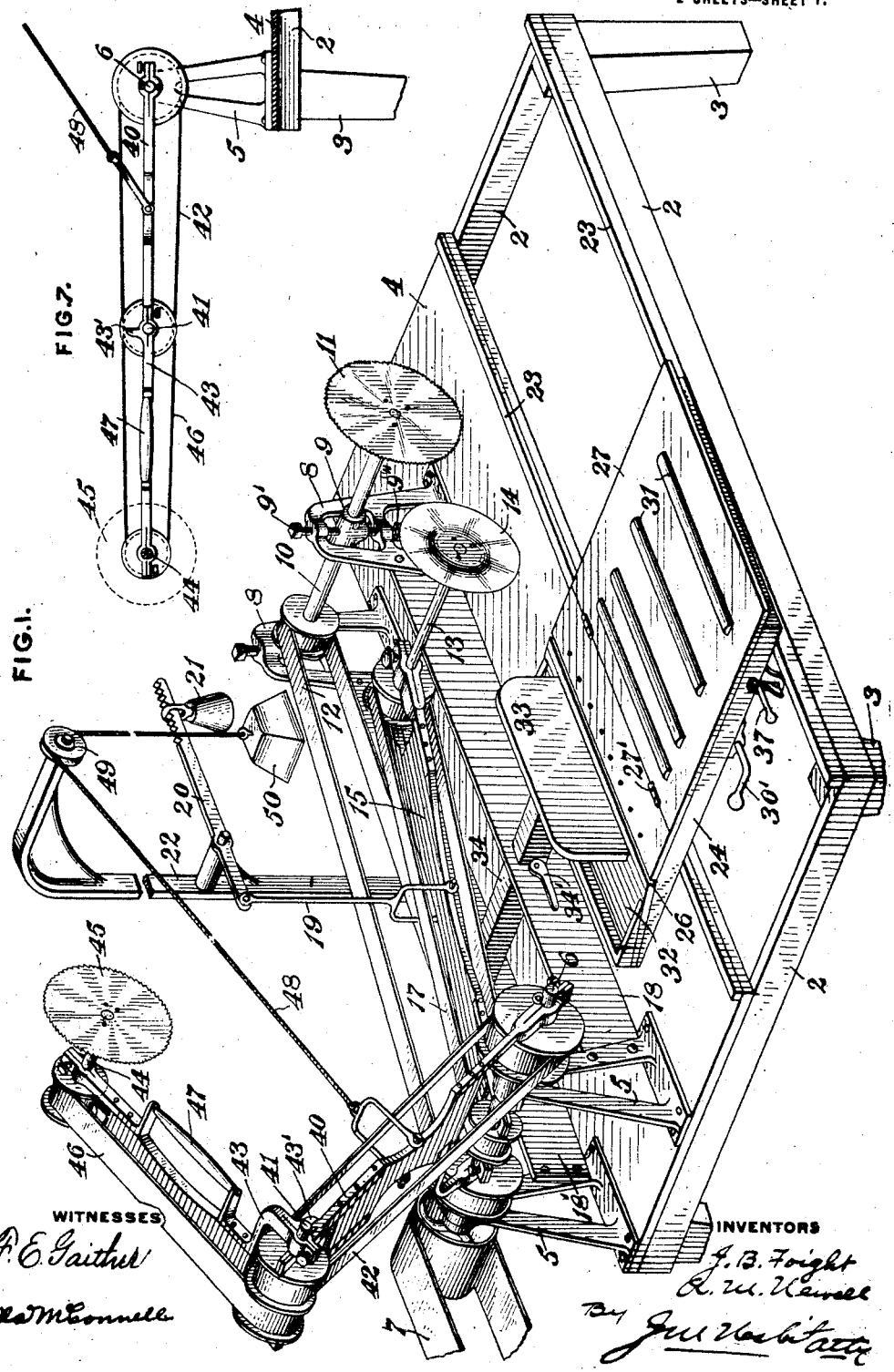

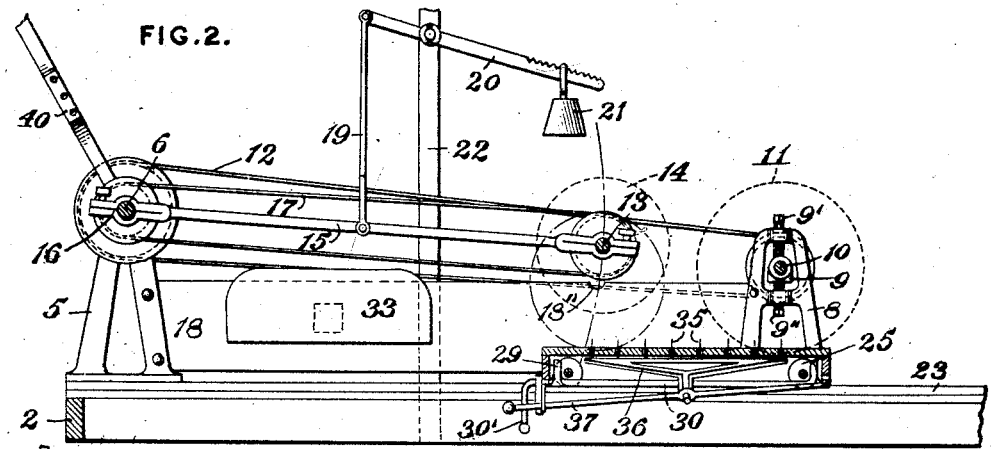
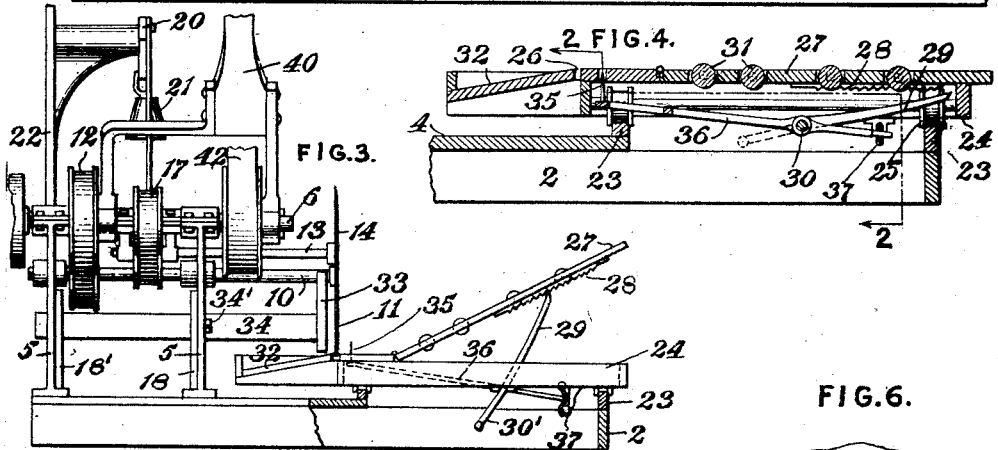
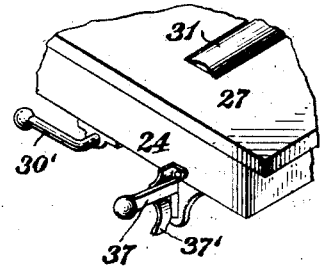
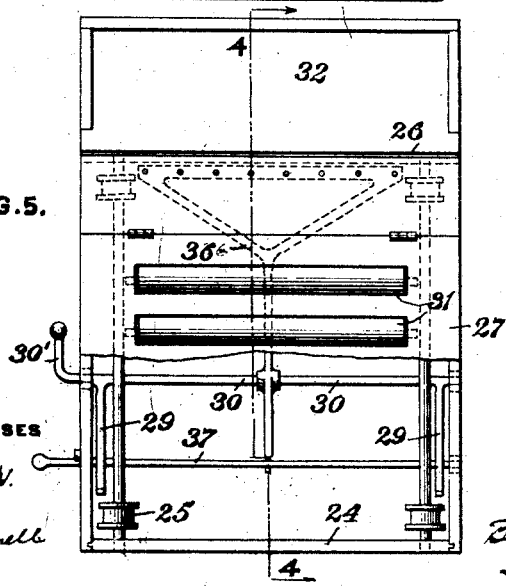

JESSE B. FOIGHT AND ATWOOD M. NEWELL, OF IRWIN, PENNSYLVANIA, ASSIGNORS TO U. S. SLICING MACHINE COMPANY, OF CHICAGO, ILLINOIS, A CORPORATION OF ILLINOIS.

MEAT AND BONE CUTTING MACHINE.

1,161,039.   Specification of Letters Patent.   Patented Nov. 23, 1915.

Application filed October 19, 1911. Serial No. 655,586.

*To all whom it may concern:*

Be it known that we, JESSE B. FOIGHT and ATWOOD M. NEWELL, residents of Irwin, in the county of Westmoreland and State of Pennsylvania, have invented certain new and useful Improvements in Meat and Bone Cutting Machines, of which the following is a specification.

The primary object of this invention is to provide a power driven machine for the use of butchers and others in cutting meat as required for steaks, roasts, chops, etc., also for splitting and dissecting carcasses into halves, quarters, etc.

In the preferred adaptation of the invention a rotary knife is capable of vertical movement so that when a bone is encountered the knife will ride over it, and at the rear of the knife is a saw which severs the bone, the saw completing the cut through the meat beneath the bone.

This invention also includes a meat-supporting carriage of novel design for presenting the meat for cutting, the supporting top surface of the carriage being adjustable for holding pieces of irregular form in required position. Coöperating with the carriage is a gage of improved construction for determining the size or width of the cut. Also embodied in the machine is power driven means which is flexibly mounted so that it may be moved to different positions for splitting or cutting suspended carcasses.

In the accompanying drawings, Figure 1 is a view in perspective of the improved machine. Fig. 2 is a side elevation, the carriage being shown in section on line 2—2 of Fig. 4. Fig. 3 is an end view partly in section. Fig. 4 is a vertical section of the carriage and carriage supporting frame, taken on line 4—4 of Fig. 5. Fig. 5 is a top plan of the carriage with a portion of its top surface broken away. Fig. 6 is a detail of a portion of the carriage. Fig. 7 is a detail of the carcass cutting or splitting portion of the machine.

Referring to the drawings, 2 indicates the frame of the table-like machine support, 3 are the legs, and 4 the top which partially covers the frame. Rising from one end of the table are the bearing stands 5 in which is journaled power shaft 6 which may be driven by any suitable steam, electric or water motor (not shown) through the medium of belt 7. Near the opposite end of the table are the stands 8 for bearings 9 which are adjustable vertically by means of screws 9', 9'', and rotatable in these bearings is shaft 10 on the end of which is mounted a saw 11, shaft 10 being connected to power shaft 6 by belt 12.

Arranged in advance of and parallel with shaft 10 is shaft 13 which carries a circular knife 14. shaft 13 being rotatable in frame 15, the latter being mounted at 16 to swing vertically on power shaft 6, belt gearing 17 connecting shafts 6 and 13. Supported by the bearing stands 5 and 8 are the longitudinal uprights 18, 18', part 18 supporting shaft 13 at notch 18'', Fig. 2, when the shaft is in lowered position. Shaft 13 is adapted to raise when knife 14 encounters a bone in the cutting operation, as will presently be described, and to facilitate this upward movement frame 15 is connected by link 19 with lever 20 carrying the adjustable counterweight 21, the lever being fulcrumed on upright 22 rising from the table.

Parallel tracks 23 on top of the table-like frame support the carriage frame 24 provided with track rollers 25, the carriage being moved by hand toward and from the knife and saw, the carriage having a slot 26 in its top surface through which the knife and saw are adapted to operate.

The meat-supporting top surface 27 of the carriage is hinged at 27' to swing vertically as may be required for properly supporting pieces of irregular shape, the top being held at the desired angle by means of racks 28 at its under surface which are engaged by dogs 29, the latter carried by shaft 30 which is operated by crank 30' projected from one end of the carriage. Rollers 31 in surface 27 facilitate the movement of the meat. The carriage frame projects inwardly beyond the line of the knife and saw, as indicated at 32, said portion providing a support for the severed meat.

To determine the width or thickness of the cut, a gage plate 33 is secured to stem 34 slidable through uprights 18, 18', and may be held in desired position by any suitable means, for instance a cam 34'. The plate is thus adjustable toward and from slot 26, and having been fixed to determine the thickness of the cut the meat resting on the carriage is placed against the gage and may be so held by a series of spurs or pointed pins 35 adapted to be projected upwardly through openings in the carriage, these pins being supported by bar 36 which is fulcrumed on the dog-carrying shaft 30, the extremity of bar 36 being engaged by the vertically movable arm 37 which projects from the end of the carriage and which may be held by spring 37' with the pins either raised or lowered. As gage 33 does not advance with the carriage, it is quite out of the way when the meat is being cut, so that the portion cut off may drop onto carriage part 32.

The piece to be cut having been properly positioned on the carriage, the latter is moved forward into the path of the rotating knife 14 and the cut is made very quickly. If a bone is encountered, as for instance when cutting steak, the movable support for the knife permits the latter to be automatically and bodily deflected so that it will ride up over the bone, and further movement of the carriage presents the bone after it has passed away from the knife, to the saw 11 which saw cuts the bone and completes the cut, severing any meat that may be beneath the bone. Cuts of various kinds are thus quickly made and the work is done far more accurately than by hand, and at a great saving of labor.

The machine is also adapted for splitting or cutting carcasses that may be suspended or otherwise supported adjacent the machine by any suitable means, not shown. For this purpose a frame 40 is mounted at one end to turn on power shaft 6, and at the free end of the frame is shaft 41 connected by a belt 42 with the power shaft. Mounted to turn on shaft 41 is the extension frame 43 carrying at its free end shaft 44 on which is mounted a shaft 45 driven by belt 46 from shaft 41. Frame 43 may be conveniently manipulated by handle 47. The extension frame 43 may be held relatively to frame 40 in the position shown in Fig. 1 by stop 43'.

To facilitate raising and lowering frame 40 the counterweighted line 48 may extend therefrom over sheave 49 on upright 22, 50 designating the counterweight at the extremity of the line. This mechanism in no way interferes with the cutting and sawing mechanism with which the carriage coöperates, and is always ready for use and may be conveniently manipulated for such cutting and splitting operations as may be carried on without placing the pieces to be cut on the carriage.

We claim:—

1. In a meat and bone cutting machine, the combination of a knife mounted on a movable support, a saw having fixed position, knife and saw actuating means, and a meat supporting carriage movable relatively to the knife and saw with the movably supported knife in advance of the saw and adapted to be deflected by a bone and clear the same.

2. In a meat and bone cutting machine, the combination of a vertically movable power-driven shaft, a knife mounted on the shaft, a second power-driven shaft having fixed position adjacent the first mentioned shaft, a saw mounted on the second shaft, and a meat support movable relatively to the knife and saw and adapted to present the meat first to the knife and then to the saw.

3. In a meat and bone cutting machine, the combination of two shafts—one shaft capable of vertical movement and the other shaft fixed against such movement, a knife mounted on the vertically movable shaft, a saw mounted on the fixed shaft, a power shaft, operating means connecting the latter with the knife and saw-carrying shafts, and means for presenting meat to the knife and saw.

4. In a meat and bone cutting machine, the combination of a frame mounted to swing vertically, a knife mounted on the frame adapted to be automatically shifted during its cutting operation, by the bone, counterweight means for assisting the frame in moving upwardly, and means for presenting meat to the knife.

5. In a meat and bone cutting machine, the combination of cutting means, a meat supporting carriage movable relatively thereto, and meat-engaging pins movable through the bottom of the support.

6. In a meat and bone cutting machine, the combination of a cutter, a supporting carriage movable toward and from the cutter, and means for maintaining the meat supporting surface of the carriage in different angular positions.

7. In a meat and bone cutting machine, the combination of cutting means, a meat supporting carriage movable relatively thereto, and a gage supported independently of said carriage and extending over the same and adjustable at right angles to the direction of the movement of the carriage.

8. In a meat and bone cutting machine, the combination of cutting means consisting of a rotatable knife and a rotatable saw having their cutting edges in alinement with each other in the direction of travel of a carriage, and a meat supporting carriage movable toward and from the cutting means, the carriage having portions at opposite sides of the line of cutting to support the meat being cut and the severed part, the support for the severed part being inclined from the cutting means.

9. In a meat and bone cutting machine, the combination of cutting means, a carriage movable relatively thereto and having a slot in its top surface through which the cutting means travels, meat-engaging pins movable through the carriage adjacent said slot, and means for varying the angle of the meat-supporting surface of the carriage.

10. In a meat and bone cutting machine, the combination of a rotatable knife mounted for free bodily movement and adapted to be automatically controlled in such bodily movement entirely by the work which is being operated upon, a rotatable saw, knife and saw rotating means, and means movable relatively to the rotating knife and saw for presenting meat thereto.

11. In a meat and bone cutting machine, the combination of a rotatable knife mounted for automatic vertical movement, a saw, knife and saw actuating means, and a meat supporting carriage movable relatively to the knife and saw for presenting the meat to the knife and to the saw, successively.

12. In a meat and bone cutting machine, the combination of a table having tracks at one side of its top surface, a carriage movable on the tracks, a rotatable saw, means on the table for supporting the saw in fixed position, a rotatable knife in advance of and alining with the saw, a vertically movable support for the knife, and driving means for the saw and knife, the saw and knife overhanging the path of movement of the carriage.

13. In a meat and bone cutting machine, the combination of a rotatable saw, a rotatable knife alining with and in advance of the saw, a carriage movable toward and from the knife and saw, and a gage in advance of the knife and overhanging the path of movement of the carriage and adjustable at right angles to such path and with which the carriage is adapted to aline in positioning the meat for cutting.

14. In a meat and bone cutting machine, the combination of cutting means, a meat supporting carriage movable relatively thereto, means for sustaining the supporting surface of the carriage in different angular positions and pins on the carriage adapted to be projected into engagement with the meat for holding the meat in place thereon, and to be retracted.

15. In a meat and bone cutting machine, the combination of a circular saw, a rotatable shaft carrying the same, a driving shaft operatively connected to the saw carrying shaft, a frame mounted to swing concentrically with the driving shaft, a shaft mounted in said frame, a circular knife secured to the shaft in advance of and in line with the saw, said knife adapted to be bodily deflected automatically by the bone in the meat, operating means connecting the saw cutting shaft with the drive shaft, and a carriage for presenting the meat to be cut, to the knife and saw.

16. In a meat and bone cutting machine, the combination of a rotatable knife mounted to move vertically, knife driving means, a meat support, and means for bringing the supported meat and the knife into cutting engagement in position to cut a slice of uniform thickness from the meat, with the rotating knife adapted to automatically ride up and over the bone presented thereto.

17. In a meat and bone cutting machine, the combination of a rotatable knife, movable vertically and which movement is automatic and entirely controlled by the meat being cut, knife rotating means, and a meat supporting carriage movable relatively to the knife for presenting the supported meat thereto in position to cut a slice of uniform thickness from the meat.

18. In a meat and bone cutting machine, the combination of a rotatable meat cutting device, said device being also mounted for bodily movement and adapted to be thus bodily moved automatically, and a bone cutting device coöperating with said cutting device.

19. In a meat and bone cutting machine, the combination of a rotatable meat cutting device, said device being also mounted for bodily movement and adapted to be thus bodily moved automatically, and a bone cutting device coöperating with said cutting device, the first said cutting device being also bodily movable with respect to the bone cutting device.

20. In a machine of the class described, the combination of a rotary cutting knife, means for positively rotating said knife and a meat support, said support and knife being capable of relative movement in position to cut a slice of uniform thickness from the meat, said knife being also mounted for bodily movement toward and away from the support, and with relation to which support the bodily movement of the cutting device is automatic.

21. In a machine of the class described, the combination of a rotary cutting knife, means for positively rotating said knife, and a meat support, said support and knife being capable of relative movement in position to cut a slice of uniform thickness from the meat, said knife being also mounted for bodily movement toward and away from the support, the said bodily movement of the cutting knife being automatically controlled by the meat being cut.

22. In a meat and bone cutting machine, the combination of a relatively movable meat support and meat cutter, said cutter being also mounted for bodily movement and which bodily movement is automatically controlled by the meat being cut, and a saw for cutting the bone.

23. In a meat and bone cutting machine, the combination of a relatively movable meat support and meat cutter, said cutter being also mounted for bodily movement and which bodily movement is automatically controlled by the meat being cut, and with relation to which meat the bodily movement of the cutter is automatic, and additional means for cutting the bone in the meat.

24. In a meat and bone cutting machine, the combination of a relatively movable meat support and meat cutter, said cutter being also mounted for bodily movement and which bodily movement is automatically controlled by the meat being cut, and a saw for cutting the bone, said cutter and saw having a fixed relation to each other.

25. In a meat and bone cutting machine, the combination of a relatively movable meat support and meat cutter, said cutter being counterbalanced and mounted for bodily movement in an upright plane and adapted to be automatically moved in such plane by a bone in the meat, and means cooperating with the cutter for cutting the bone.

26. In a meat and bone cutting machine, the combination of a relatively movable meat support and meat cutter, said cutter being counterbalanced and mounted for bodily movement in an upright plane and adapted to be automatically moved in such plane by a bone in the meat, and means cooperating with the cutter for cutting the bone, the last said means and the meat support being also relatively movable.

27. In a meat and bone cutting machine, the combination of a relatively movable meat support and meat cutter, said cutter being counterbalanced and mounted for bodily movement in an upright plane and adapted to be automatically moved in such plane by a bone in the meat, and means cooperating with the cutter for cutting the bone, the last said means and the meat support being also relatively movable, and said cutter and bone cutting means having a fixed relation with each other.

28. In a meat and bone cutting machine, the combination of a counterbalanced rotary meat cutter mounted for free movement in an upright plane and adapted to be controlled in the last said movement entirely by the meat being cut and to be bodily deflected by the bone in the meat, a meat holder, said cutter and holder being capable of relative movement whereby the cutter and the meat will be presented in cutting relation, and a rotary saw for cutting the bone.

29. In a meat and bone cutting machine, the combination of a counterbalanced rotary meat cutter mounted for free movement in an upright plane and adapted to be controlled in the last said movement entirely by the meat being cut and to be bodily deflected by the bone in the meat, a meat holder, said cutter and holder being capable of relative movement whereby the cutter and the meat will be presented in cutting relation, and a rotary saw for cutting the bone, said cutter and saw being mounted independently of each other.

30. In a meat and bone cutting machine, the combination of a counterbalanced rotary meat cutter mounted for free movement in an upright plane and adapted to be controlled in the last said movement entirely by the meat being cut and to be bodily deflected by the bone in the meat, a meat holder, said cutter and holder being capable of relative movement whereby the cutter and the meat will be presented in cutting relation, and a rotary saw for cutting the bone, said cutter and saw being mounted independently of each other and having a fixed relation to each other.

31. In a meat and bone cutting machine, the combination of a rotatable knife mounted for vertical movement, said vertical movement being automatic and entirely controlled by the meat, a saw, knife and saw actuating means, and a meat supporting carriage, said knife and saw, and the said carriage being relatively movable for causing the knife and saw to operate upon the meat successively.

32. In a meat and bone cutting machine, the combination of a rotatable knife, means whereby the knife will be automatically deflected by the bone in the meat, a support for the meat, said support and knife being relatively movable, and a saw for cutting the bone, said saw being fixed against bodily operating movement.

33. In a meat and bone cutting machine, the combination of a rotatable knife, means whereby the knife will be automatically deflected by the bone in the meat, and counterbalancing means for the knife.

34. In a meat and bone cutting machine, the combination of a rotatable knife, means whereby the knife will be automatically deflected by the bone in the meat, and adjustable counterbalancing means for the knife.

35. In a meat and bone cutting machine, the combination of a rotatable knife, means whereby the knife will be automatically deflected by the bone in the meat, a support for the meat, said support and knife being relatively movable, and a gage coöperating with the support.

36. In a meat and bone cutting machine, the combination of a knife, a support for the meat, said support and knife being relatively movable, and an adjustable gage extending over the support, said support being movable relatively to the gage.

37. In a meat and bone cutting machine, the combination of a knife, a support for the meat, said support and knife being relatively movable, means whereby the angle of inclination of the meat support may be varied, and holding means carried by the support and adapted to be projected and retracted with respect to the support into and out of engagement with the meat.

38. A meat and bone cutting machine embodying a rotatable knife, means for positively rotating said knife, a support for the meat movable relative to said knife in position to cut a slice of uniform thickness from said meat, and means whereby the knife will be automatically deflected by the bone in the meat.

39. A meat and bone cutting machine embodying a rotatable knife, means for positively rotating said knife, a carriage for the meat, a support for said carriage, said carriage being movable on said support in position to cause said knife to cut a slice of uniform thickness from said articles, and means whereby the movement of the carriage relative to said knife will cause the knife to be automatically deflected by the bone in the meat.

40. The combination with a knife cutting element of a saw cutting element coöperating therewith and a meat support, said cutting elements being capable of an independent relative bodily movement in a direction toward and from the plane of the meat support and arranged to operate successively in the same kerf, the saw operating after the knife.

41. The combination with a rotary knife cutting element having its axis of rotation confined substantially to a stationary plane, of a holder coöperating therewith and movable in a straight line transversely to said plane, said holder and cutting element being so arranged as to provide an automatic bodily movement relative to the line of movement of said holder.

In testimony whereof we affix our signatures in presence of two witnesses.

JESSE B. FOIGHT.
ATWOOD M. NEWELL.

Witnesses:
 ADAM SCHADE,
 LOUIS SCHULLTIERS.